United States Patent
Albl et al.

(10) Patent No.: US 10,267,355 B2
(45) Date of Patent: Apr. 23, 2019

(54) WHEEL BEARING FOR A MOTOR VEHICLE

(71) Applicant: AUDI AG, Ingolstadt (DE)

(72) Inventors: Johannes Albl, Ingolstadt (DE); Michael Frisch, Schönberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/855,040

(22) Filed: Dec. 27, 2017

(65) Prior Publication Data

US 2018/0195552 A1    Jul. 12, 2018

(30) Foreign Application Priority Data

Jan. 11, 2017  (DE) .................. 10 2017 200 338

(51) Int. Cl.
*F16C 19/18*  (2006.01)
*F16D 65/12*  (2006.01)
(Continued)

(52) U.S. Cl.
CPC ........ *F16C 19/182* (2013.01); *B60B 27/0005* (2013.01); *B60B 27/0052* (2013.01);
(Continued)

(58) Field of Classification Search
CPC ............ B60B 27/0005; B60B 27/0052; B60B 27/0073; F16C 2326/02
See application file for complete search history.

(56) References Cited

U.S. PATENT DOCUMENTS 4,372,628 A * 2/1983 Kiener ................ B60B 27/0005
                                                    384/476
8,764,303 B2 * 7/2014 Baumann ................ F16D 21/06
                                                    384/544
(Continued)

FOREIGN PATENT DOCUMENTS

DE    3140373 A1    4/1983
DE    10044509 A1   4/2001
(Continued)

OTHER PUBLICATIONS

German Search Report dated Sep. 11, 2017 of corresponding German application No. 102017200338.3; 8 pgs.

(Continued)

*Primary Examiner* — Thomas R Hannon
(74) *Attorney, Agent, or Firm* — Maier & Maier, PLLC

(57) ABSTRACT

A wheel bearing for a motor vehicle is provided with an outer ring, an inner ring arranged at least partially inside the outer ring, and with a longitudinal axis extending in the axial direction of the outer ring and of the inner ring from a vehicle inner side to a vehicle outer side. The inner ring is provided with a flange section on its end facing the vehicle inner side having a first section at the point that is farthest from axial center of the outer ring, and with a second section which forms a contact surface for attaching a brake disk. The flange section is formed stepped in such a way, so that the contact surface for attaching the brake disk is arranged offset relative to the section of the flange section at the farthest point from the axial center of the outer ring in the axial direction toward the vehicle inner side, and so that an at least a partially circumferential projection is located on the side opposite the contact surface for attaching the brake disk.

7 Claims, 4 Drawing Sheets

(51) Int. Cl.
*B60B 27/00* (2006.01)
*F16C 33/60* (2006.01)
*F16C 33/78* (2006.01)
*F16C 33/80* (2006.01)
*F16C 33/58* (2006.01)
*F16D 65/02* (2006.01)
*B60B 27/02* (2006.01)
*B60B 3/16* (2006.01)

(52) U.S. Cl.
CPC ........ *B60B 27/0073* (2013.01); *F16C 33/586* (2013.01); *F16C 33/60* (2013.01); *F16C 33/7876* (2013.01); *F16C 33/805* (2013.01); *F16D 65/12* (2013.01); *B60B 3/16* (2013.01); *B60B 27/0015* (2013.01); *B60B 27/0078* (2013.01); *B60B 27/0094* (2013.01); *B60B 27/02* (2013.01); *B60B 2380/12* (2013.01); *B60B 2380/80* (2013.01); *B60B 2900/111* (2013.01); *B60B 2900/114* (2013.01); *F16C 19/186* (2013.01); *F16C 2326/02* (2013.01); *F16D 2065/1356* (2013.01); *Y02T 10/86* (2013.01)

(56) References Cited

U.S. PATENT DOCUMENTS

| | | | | |
|---|---|---|---|---|
| 8,979,385 | B2* | 3/2015 | Haepp | F16C 33/7886 384/480 |
| 9,233,577 | B2* | 1/2016 | Bosco | B60B 27/0073 |
| 2005/0283979 | A1* | 12/2005 | Sakamoto | B60B 3/04 29/898.061 |
| 2007/0033787 | A1 | 2/2007 | Shibata et al. | |
| 2014/0037239 | A1* | 2/2014 | Duch | B60B 27/0073 384/480 |
| 2015/0003765 | A1 | 1/2015 | Inoue et al. | |

FOREIGN PATENT DOCUMENTS

| | | |
|---|---|---|
| DE | 102005022083 A1 | 12/2005 |
| EP | 1 006 290 A1 | 6/2000 |
| JP | 2009286238 A | 12/2009 |
| JP | 2016003709 A | 1/2016 |
| WO | 2006/095603 A1 | 9/2006 |
| WO | 2007075386 A2 | 5/2007 |
| WO | 2013/100285 A1 | 7/2013 |

OTHER PUBLICATIONS

European Search report dated Jun. 21, 2018, in connection with corresponding European Application No. 17206766.2; 7 pgs.

* cited by examiner

WHEEL BEARING FOR A MOTOR VEHICLE

FIELD

The invention relates to a wheel bearing for a motor vehicle.

BACKGROUND

A conventional wheel bearing is known from DE 31 40 373 A1. In this case, the brake disk is in one embodiment centered on the jacket surface of an axially projecting shoulder of a mounting flange.

Another such wheel bearing is known from JP 2016 003709. In this case, a part of the flange section projects over the outer ring of the wheel bearing in the direction of the inner side of the vehicle in order to serve as an element of the wheel-side sealing.

Another such wheel bearing is described in WO 2007/075386 A2. In this case, a thicker design of the wheel hub is created in the area of the wheel bolt in order to produce a sufficient clamping length for the wheel bolt. The flange section of the inner ring of the wheel bearing is provided with a contact surface on which the brake disks and the rim are fixed. A similar wheel bearing is indicated also in JP 2009 286238 A.

The problem with the known wheel bearing is that a relatively large space is required, as well as a high weight of the wheel bearing.

SUMMARY

The objective of the present invention is therefore to provide a wheel bearing for a motor vehicle which has a compact and weight-optimized construction.

With the stepped or offset embodiment of the flange section, a very compact design of the wheel bearing according to the invention is obtained because the contact surface for the brake disk is offset with a correspondingly large design of the inner diameter created in the direction of the inner side of the vehicle, so that the installation space required for the wheel bearing and for the brake disk that is attached to it is reduced, as the thickness of the brake disk hub is completely or partially eliminated from the scale chain for the axial installation space. At the same time, the rearward flange section is provided on the opposite side to the bearing surface of the brake disk with an at least partially circumferential projection, which increases the strength of the flange section, or which helps to preserve a conventional solution that is not offset. Since this circumferential projection is located in the direction of the inner side of the vehicle, it advantageously does not contribute to increasing the axial installation space of the wheel bearing according to the invention. The stepped design of the flange section is in this case provided not only locally in the area of the wheel screws or wheel bolts, but also around the entire circumference of the wheel bearing.

In a very advantageous further development of the invention it can be provided that the contact surface is arranged outside, opposite the section of the flange section and at the furthest point from the axial center of the outer ring in the radial direction. This results in an increased inner diameter of the brake disk in comparison to known solutions, so that an additional space is created in the central region of the wheel bearing, which is to say in the area around the longitudinal axis. The increased inner diameter of the brake disk in addition also makes it possible to reduce the weight of the brake disk. Moreover, the greater diameter of the brake disk also makes it possible to transmit a higher friction.

The very compact design of the wheel bearing according to the invention can still be further improved when a radial seal or a set of rollers is arranged outside of the parts of the outer ring so as to surround the projection at least partially, on the side opposite the contact surface provided for mounting the brake disk.

The same applies also if the inner diameter of the brake disk is greater than the diameter of a bearing surface of the outer ring, measured in the contact angle, for example with a shortened outer ring.

In a very advantageous further development of the invention, the inner diameter of the brake disk hub is increased in order to extend the wheel bearing in the axial direction underneath the brake disk toward the exterior of the vehicle. This can be realized while maintaining the axial installation space of a conventional solution by providing a larger row spacing or more sealing space, which has an advantageous effect on the service life and on tightness characteristics. Moreover, a double flange is avoided and a reduction of the weight is achieved. The extension can also protrude into the area of the rim.

In order to produce an approximately flat surface in the area of the exterior of the vehicle, it can be also provided that the offset of the contact surface for attaching the brake disk relative to the section of the flange portion that is located at the greatest distance from the axial center of the outer ring in the axial direction corresponds at least approximately to the thickness of the brake disk. The space savings obtained with the stepped design of the flange section would thus in this case correspond exactly to the thickness or to the strength of the brake disk.

It can be further also provided that the brake disk is provided with such an inner diameter that the wheel bolts attached to the wheel bearing lie at least partially further outward than the inner diameter of the brake disk, which is to say that the through holes for the brake disk do not need to be closed radially inward.

An advantage of this embodiment is that it is possible to omit the complicated production of the drilling pattern of the brake disk (inner centering and holes for the wheel bolts), because a positioning and centering guide can be created also in the casting mold.

BRIEF DESCRIPTION OF THE FIGURES

The following is a description of embodiments of the invention, wherein the principles are illustrated in the figures.

The figures show the following.

DETAILED DESCRIPTION OF THE FIGURES

Figure 1:
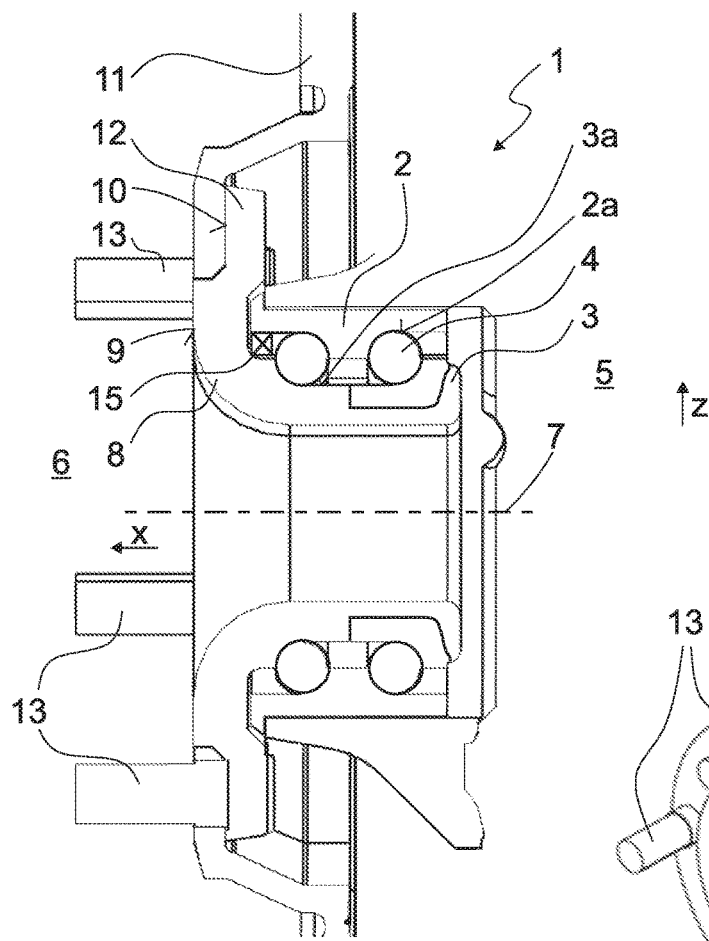
FIG. 1 a sectional view of the wheel bearing according to the invention when it is assembled with a wheel carrier and a brake disk.

FIG. 1 shows a wheel bearing 1 for a motor vehicle, not shown. The wheel bearing 1 is provided with an outer ring 2 and with an inner ring 3 which is at least partially arranged inside the outer ring 3. Between the outer ring 2 and the inner ring 3 is arranged in a known matter a plurality of roller element sets 4 forming roller elements which fit closely a bearing surface 2a of the outer ring 2 and a bearing surface 3a of the inner ring 3.

The wheel bearing 1 has a longitudinal axis 7, which is extending in the axial direction and indicated here by "x", of the outer ring 2 and the inner ring 3, from a vehicle inner side 5 to a vehicle outer side 6 of the longitudinal axis 7. On the vehicle outer side 6 of the wheel bearing 1 can be attached in a per se known manner a wheel, not illustrated here. For this purpose, the inner ring 3 is provided on its end that is oriented toward the vehicle outer side 6 with a flange section 8, which has a first portion 9, which is referred to as section 9 that is at the farthest section from an axial center of the outer ring 2, and a second section, which forms a contact surface 10 for attaching a brake disk 11, on which is in turn fixed the wheel, not shown here, by means of the wheel bolts 13.

As can be seen in FIG. 1, the flange 8 is formed stepped or offset in the area of the contact surface 10. This gradation of the flange section 8 is formed in such a way that the contact surface 10, which is used to attach the brake disk 11 to the wheel bearing 1, is arranged offset relative to the section 9 of the flange section 8 in axial direction x toward the vehicle inner side 5. The offset of the contact surface 10 relative to the section 9 is thus created opposite to the direction of the arrow x shown in FIG. 1.

On the contact surface 10 for the brake disk 11 which is located on the opposite side, the flange section 8 is provided with a circumferential projection 12 at least in areas relevant to strength, in particular from connecting areas of the wheel bolt 13 to the ball set located between the outer ring 2 and the inner ring 3. Higher wall thicknesses are thus obtained in this manner than what would be the case with a simple indentation. Since the flange as such is manufactured as a forged part with subsequent machining, this also results in metallurgical fiber pathways, which are conducive to imparting a higher strength. However, this contour can be also produced with other manufacturing methods, for example by using casting and/or machining.

As can be seen also from FIG. 1, the circumferential projection 12 is located in the radial direction outside of the outer ring 2, which in addition also contributes to the compact design of the wheel bearing 1. The circumferential projection 12 is in the present case so large that the outer ring 2 forms with the step of the inner ring 3 an undercut, so that a seal that is required for the compact construction of the wheel bearing 1 against the penetration of dirt and water is facilitated by the narrow inner gap.

However, depending on the geometry of the outer ring 2, the projection 12 may be arranged only radially outside of the contact surface 2 of the outer ring 2 or of an area of the wheel-side wheel bearing seal.

In addition, it can also be seen from FIG. 1 that the offset of the contact surface 10 for the brake disk 11 against the section 9 of the flange section 8 for the wheel in the axial direction x in principle corresponds to the thickness of the brake disk 11, so that on the external vehicle side 6 of the wheel bearing 1 is created as a smooth or flat surface during the transition of the brake disk 11 to the flange section 8 of the inner ring 3.

Figure 2:
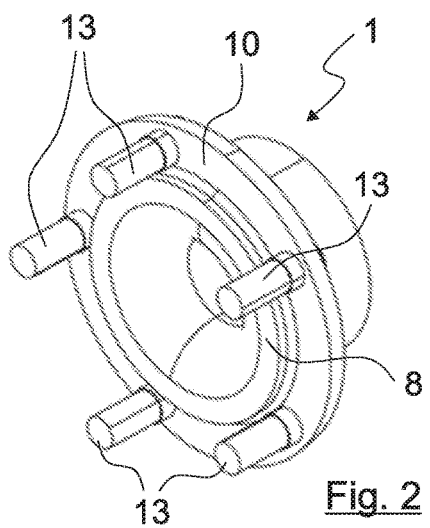
FIG. 2 a perspective view of a first embodiment of the wheel bearing according to the invention.
Figure 3:
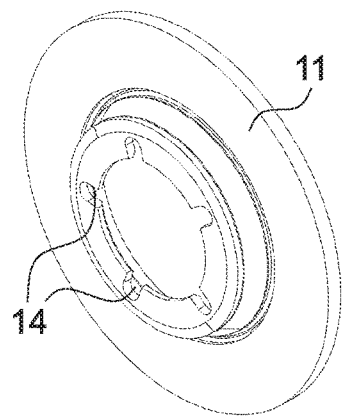
FIG. 3 a perspective view of a brake disk matching the wheel bearing of FIG. 2.
Figure 4:
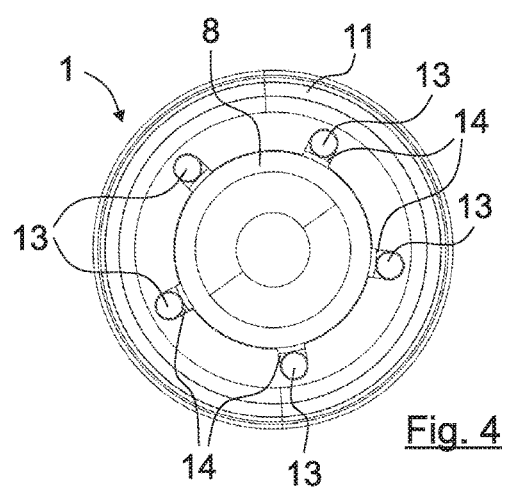
FIG. 4 a top view of a brake disk of FIG. 3 mounted with the wheel bearing of FIG. 2.

FIGS. 2, 3 and 4 show illustrations of embodiments of the wheel bearing 1 and of a matching brake disk 11. FIG. 4 in this case shows an assembled state of the wheel bearing 1 which is assembled with the brake disk 11. In this case it is evident that the brake disk 11 is provided with such an inner diameter that the wheel bolts 13 attached to the wheel bearing 1 are located at least partially radially outside of the inner diameter of the break disk 11. In order to implement the design of the wheel bolts 13, the brake disk 11 is provided with recesses 14 which are illustrated in FIGS. 3 and 4. The brake disk 11 can thus be positioned or centered in this manner by means of the wheel bolts 13 and the recesses 14. In addition, the wheel bolts 13 also serve to prevent twisting of the brake disk 11, which is to say that the brake disk 11 is provided in addition to the conventional fort locking design also with a form locking design.

Figure 5:
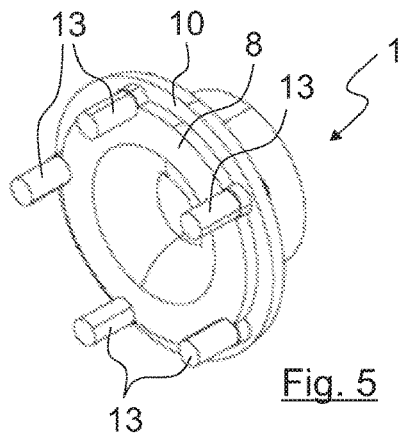
FIG. 5 a perspective view of a second embodiment of the wheal bearing according to the invention.
Figure 6:
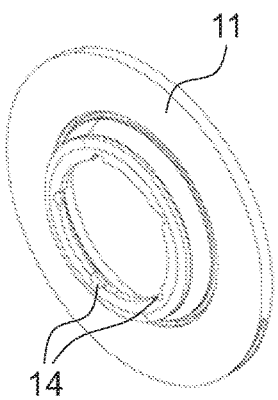
FIG. 6 a perspective view of a brake disk matching the wheel bearing of FIG. 5.

FIGS. 5 and 6 show another embodiment of the wheel bearing 1 as well as a matching brake disk 11. It is in this case evident that the contact surface 10 for the brake disk 11 is arranged in the radial direction z further outside than in the embodiment shown in FIGS. 2 through 4. The inner diameter of the brake disk 11 can thus be increased even more, resulting in smaller recesses 14 for the realization of the wheel bolts 13.

Due to the design of the recesses 14 which is opened in the direction of the inner diameter of the brake disk 11, the bores in the brake disk 11, which are otherwise unnecessary, can be avoided here. When no centering of the brake disk 11 is performed by means of the recesses 14, they can remain in the untreated state. Centering of the brake disk 11 can be also performed by means of the lower or the upper end of the second contact surface 10 for the brake disk 11.

Figure 7:
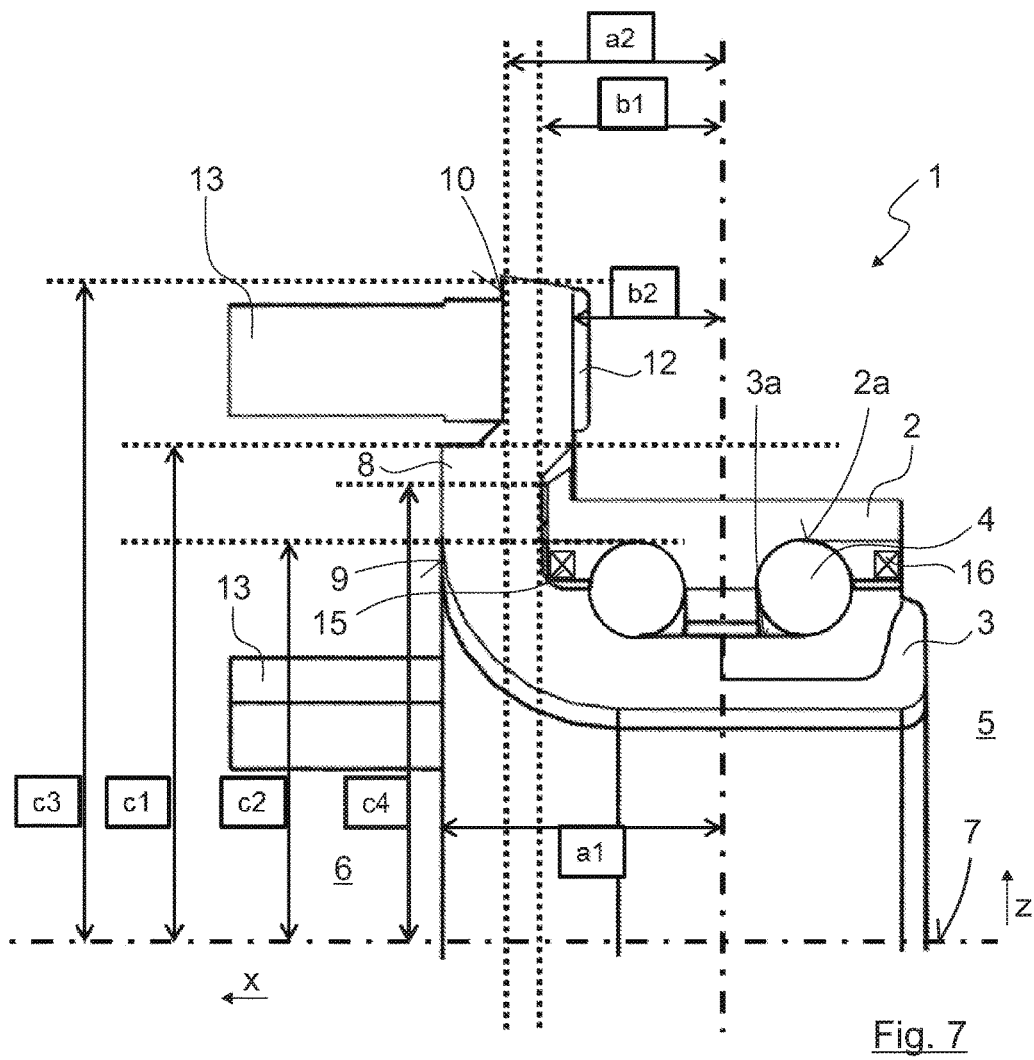
FIG. 7 a sectional view of the wheel bearing according to the invention with the dimensions indicated therein.

As shown in FIG. 7, several dimensions of the wheel bearing 1 are indicated, which serves to illustrate the geometrical design of the wheel bearing. The dimensions indicated here have in this case the following meaning:

a1=The distance of the flange section 8 on the outer side of the vehicle from the center of the wheel bearing 1.

a2=The distance of the contact surface 10 for the brake disk 11 from the center of the wheel bearing 1.

b1=The distance of the flange section 8 in the area radially inside the diameter c4 from the center of the wheel bearing 1.

b2=The distance of the flange section 8 in the area radially outside the diameter c4 from the center of the wheel bearing 1.

c1=The distance of the lower shoulder of the contact surface 10 for the brake disk 11 from the longitudinal axis 7 of the wheel bearing 1.

c2=The distance of the bearing surface 2a of the outer ring 2 from the longitudinal axis 7 of the wheel bearing 1.

c3=The distance of the outer edge of the flange section 8 from the longitudinal axis 7 of the wheel bearing 1.

c4=The distance of the recess of the inner ring 3 for the part of the outer ring 2 of the wheel bearing seal 15 or of the roller element set 4 from the longitudinal axis 7 of the wheel bearing 1.

The following conditions apply in this case:

a1>a2: The end of the flange section 8 on the outer side of the vehicle is closer to the vehicle outer side 6 than the contact surface 10 for the brake disk 11.

b1>b2: the area designated for screws, in which the wheel bolts 13 are located, is shifted relative to the wheel hub radially outside of the parts of the outer ring 2, of the wheel seal 15 or of the roller element set 4 in the direction of the vehicle inner side 5, c1>c2: the internal diameter of the brake disk 11 is greater than the diameter of the bearing surface 2a of the outer ring 2, measured in the contact angle.

Figure 8:
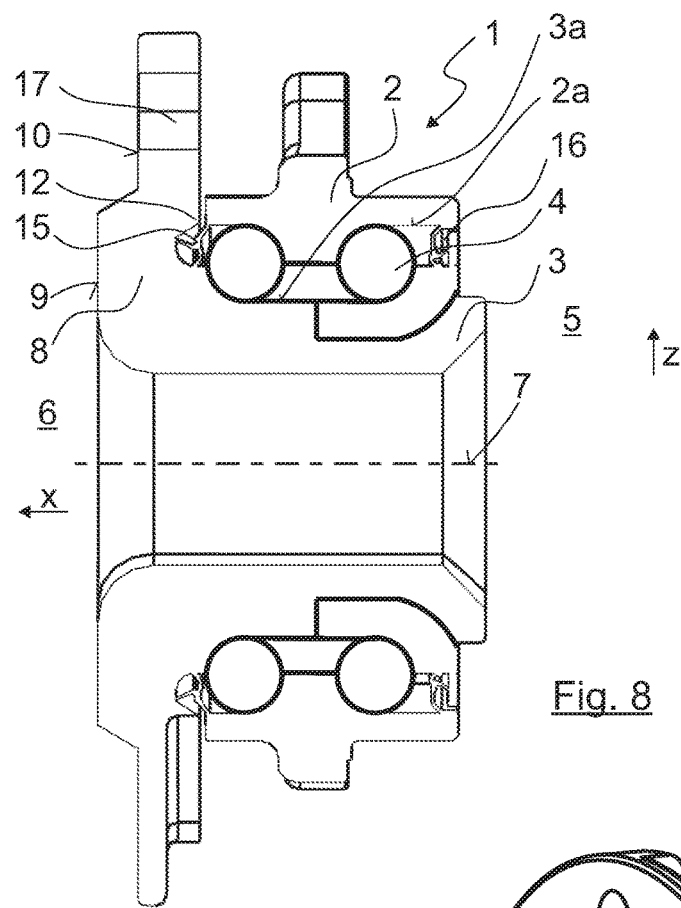
FIG. 8 a sectional view of another embodiment of the wheel bearing according to the invention.
Figure 9:
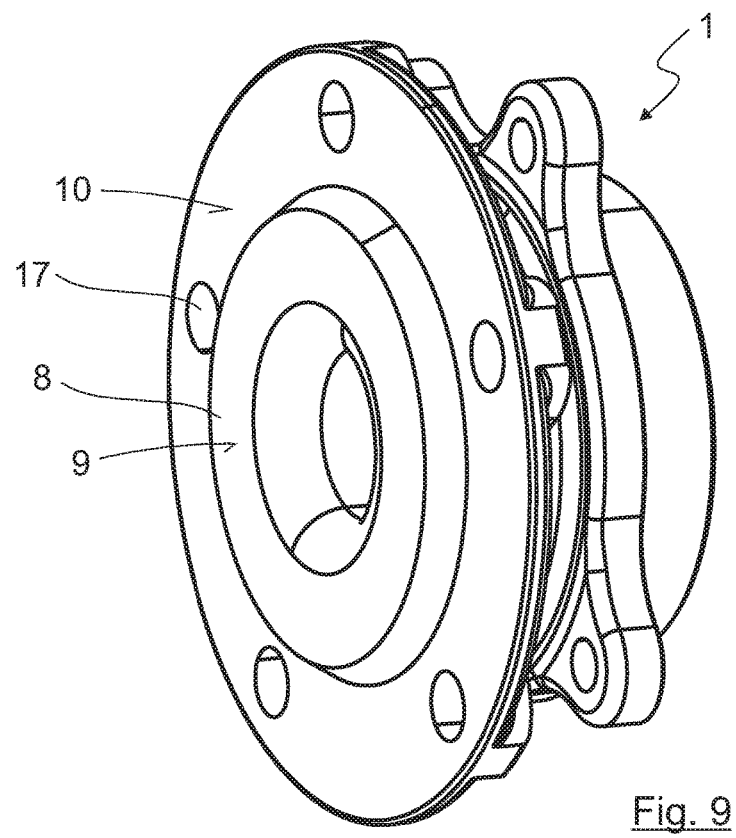
FIG. 9 a perspective view of the wheel bearing of FIG. 8.
Figure 10:
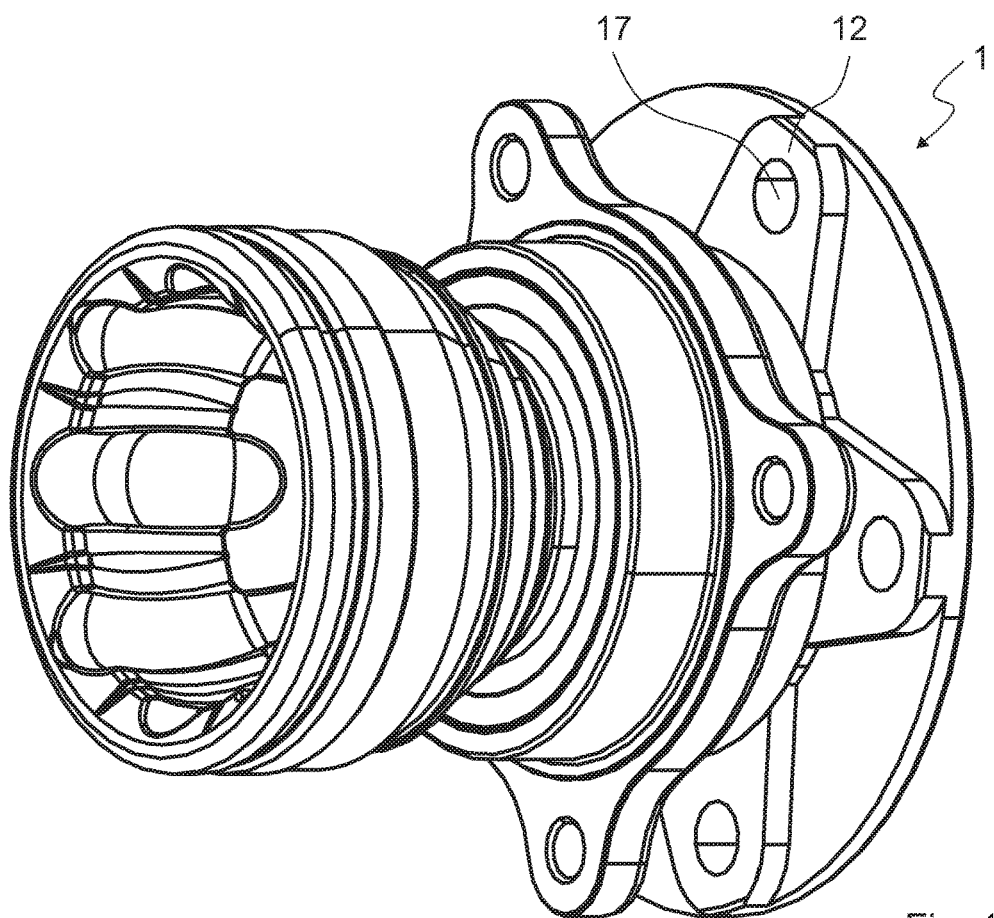
FIG. 10 another perspective view of the wheel bearing of FIG. 8.
Figure 11:
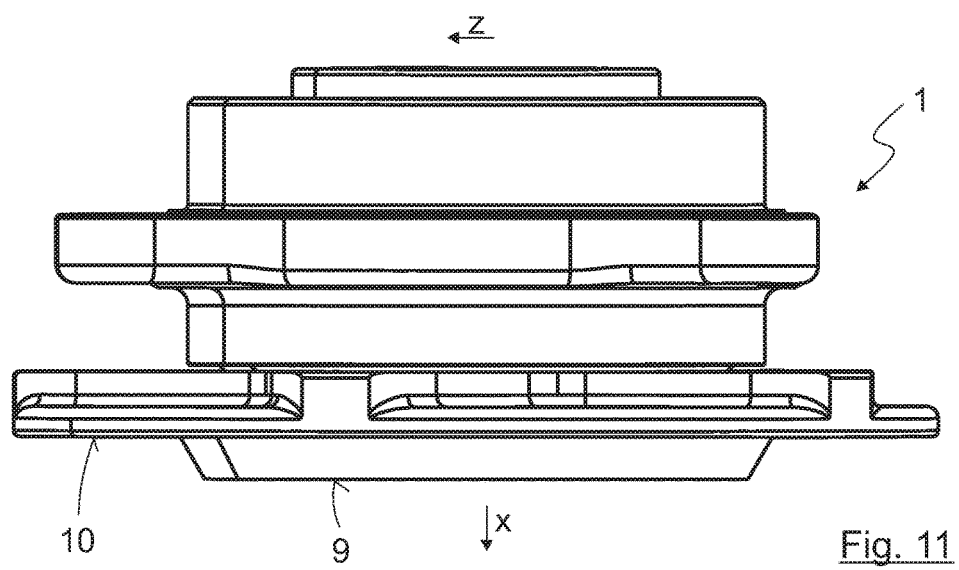
FIG. 11 a lateral view of the wheel bearing of FIG. 8.

FIGS. 8 through 10 illustrate several views of another embodiment of the wheel bearing 1. In this case, additional wheel bearing seals 15 and 16 can be seen arranged between the outer ring 2 and the inner ring 3. In particular, it is evident from FIG. 8 that the projection 12 is arranged radially outside of the wheel-side wheel bearing seal 15. In addition, the wheel bolts 13 are in this embodiment replaced by corresponding bores 17, into which the wheel screws, not shown, are screwed in order to attach the wheel. The dimension ratios described with reference to FIG. 7 are applied also in this embodiment variant.

The invention claimed is:

1. A wheel bearing for a motor vehicle, comprising:
    an outer ring, with an inner ring, which is at least partially arranged inside the outer ring, and with a longitudinal axis extending in axial direction of the outer ring and of the inner ring from a vehicle inner side to a vehicle outer side, wherein the inner ring is provided at its end facing the vehicle outer side with a flange section having a first section arranged at the furthest point from the axial center of the outer ring, and a second section, which forms a contact surface for attaching a brake disk, and wherein the flange section is designed so that it is stepped in such a way that the contact surface for attaching the brake disk is disposed offset relative to the section of the flange section at the furthest point from the axial center of the outer ring of the flange section in the axial direction towards the vehicle inner side, wherein on the side opposite the contact surface for attaching the brake disk is disposed an at least partially circumferential projection, and that the projection forms an undercut into which projects at least one wheel bearing seal.

2. The wheel bearing according to claim 1, wherein the contact surface for attaching the brake disk is arranged outside the section of the flange section in the radial direction at the furthest point from the axial center of the outer ring.

3. The wheel bearing according to claim 1, wherein the at least partially circumferential projection is disposed in the radial direction outside of the parts of the outer ring, the at least one wheel bearing seal or a roller element set.

4. The wheel bearing according to claim 1, wherein the inner diameter of the brake disk is larger than the diameter of a bearing surface of the outer ring measured in a contact angle.

5. The wheel bearing according to claim 1, wherein the offset of the contact surface for attaching the brake disk with respect to the furthest point from the axial center of the outer ring of the portion of the flange in the axial direction at least approximately corresponds to the thickness of the brake disk.

6. The wheal bearing according to claim 1, wherein the brake disk is provided with such an inner diameter that wheel bolts attached to the wheel bearing are at least partially disposed radially further outside than the inner diameter of the brake disk.

7. The wheel bearing according to claim 6, wherein the brake disk is provided with recesses for the implementation of the wheel bolts.

* * * * *